US007167872B2

(12) United States Patent
Linn et al.

(10) Patent No.: US 7,167,872 B2
(45) Date of Patent: Jan. 23, 2007

(54) EFFICIENT FILE INTERFACE AND METHOD FOR PROVIDING ACCESS TO FILES USING A JTRS SCA CORE FRAMEWORK

(75) Inventors: Charles Alan Linn, Fairport, NY (US); Anthony Joseph DiBernardo, Fairport, NY (US); Richard Roger Pufky, East Rochester, NY (US)

(73) Assignee: Harris Corporation, Melbourne, FL (US)

( * ) Notice: Subject to any disclaimer, the term of this patent is extended or adjusted under 35 U.S.C. 154(b) by 534 days.

(21) Appl. No.: 10/337,997

(22) Filed: Jan. 8, 2003

(65) Prior Publication Data

US 2004/0133554 A1 Jul. 8, 2004

(51) Int. Cl.
*G06F 17/30* (2006.01)
(52) U.S. Cl. ............... 707/103 R; 707/100; 707/101; 707/102; 707/104.1
(58) Field of Classification Search .................. 707/2, 707/200, 100, 101, 102, 103 R, 104.1; 709/203, 709/217; 715/719; 717/103
See application file for complete search history.

(56) References Cited

U.S. PATENT DOCUMENTS

| | | | | |
|---|---|---|---|---|
| 5,675,802 | A * | 10/1997 | Allen et al. ................. | 717/103 |
| 6,507,351 | B1 * | 1/2003 | Bixler ........................ | 715/810 |
| 6,658,461 | B1 * | 12/2003 | Mazo ......................... | 709/217 |
| 6,791,579 | B1 * | 9/2004 | Markel ....................... | 715/719 |
| 2003/0093467 | A1 * | 5/2003 | Anderson ................... | 709/203 |
| 2003/0115218 | A1 * | 6/2003 | Bobbitt et al. ............. | 707/200 |

OTHER PUBLICATIONS

Medeiros et al., Simulation Software Component Architecture for Simulation-Based Enterprise Applications, Proceedings of the 1998 Simulation Conference, pp. 1717-1721.*
Casgni et al. Comparison of Two Component Framework: The FIPA-Compliant Multi-Agent System and the Web-Centric J2EE Platform, IEEE, 2003, pp. 341-351.*
Meng, Building Efficient and Effective Metasearch Engines, ACM Computing Surveys, vol. 34, No. 1, Mar. 2002, pp. 48-89.*
Yeh et al., Manipulating Recovered Softwae Architecture Views, ACM, 1997, pp. 184-194.*
Khalidi et al., Extensible File Systems in Spring, ACM, 1993, pp. 1-14.*
Naim Abdullah et al., "A User-Level Network File System in Command Interpreter," IEEE Computer Society Office Automation Symposium, Apr. 27-29, 1987, pp. 68-75.

(Continued)

*Primary Examiner*—Frantz Coby
(74) *Attorney, Agent, or Firm*—Duane Morris LLP (57) ABSTRACT

A system and method for accomplishing improved file access within a Joint Tactical Radio System (JTRS) Software Component Architecture (SCA) system environment is described. A file access class may be added to an existing JTRS SCA system, the added file access class being an instance of a JTRS SCA file access class. Using this system and method, clients requesting access to a file may be allowed to use more direct file access methods, bypassing a JTRS SCA service, if the file of interest is local to the requesting client's environment, e.g. local to the same processor. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

18 Claims, 5 Drawing Sheets

OTHER PUBLICATIONS

Sabri Murat Bicer, "A Software Communications Architecture Compliant Software Defined Radio Implementation," Northeastern Univ., Jun. 2002, pp. 1-92.
MSRC-5000SCA, "Software Communications Architecture Specification," Appendix C, Core Framework IDL, pp. C-1 thru C-82.
MSRC-5000SCA, "Software Communications Architecture Specification," Nov. 17, 2001, pp. 1-1 thru 7-1.
MSRC-5000SCA, "Support and Rationale Document for theSoftware Communications Architecture Specification," Dec. 19, 2001, pp. 1-1 thru 7-32.

* cited by examiner

EFFICIENT FILE INTERFACE AND METHOD FOR PROVIDING ACCESS TO FILES USING A JTRS SCA CORE FRAMEWORK

GOVERNMENT LICENSE RIGHTS TO CONTRACTOR-OWNED INVENTION

The U.S. Government has a paid-up license in this invention and the right in limited circumstances to require the patent owner to license others on reasonable terms as provided for by the terms of Government Contract Number: DAAB15-00-9-0003awarded by Joint Tactical Radio System (JTRS) Joint Program Office (JPO).

BACKGROUND OF THE INVENTION

The present invention relates to accessing files using a file interface.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and a POSIX-based Operating System (OS) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them; some may be implemented by non-core applications (i.e. waveforms, etc.); and some may be implemented by hardware device providers.

The file interface provided by the JTRS SCA typically provides the ability to read and write a file residing within a CF-compliant, distributed file system. The JTRS SCA file system interface typically defines a non-optimized file interface comprising set of CORBA operations that enable remote access to a physical file system, e.g. one located at a distance from the JTRS device. The file system interface further typically provides traditional operations associated with file accesses (i.e. remove, copy, directory listing, etc.).

Additionally, the file system should make the underlying physical file system at the remote location transparent to the JTRS device user. Accordingly, different file systems like FAT32, NTFS, and the Unix file system may be used with the same file interface.

However, use of CORBA interfaces often slows access to files and adds overhead to the JTRS device. The JTRS system, e.g. the JTRS SCA, forces client file access into using a cumbersome process. Clients wishing to avoid that process may be forced into using non-compliant methods to access files.

DETAILED DESCRIPTION OF THE PREFERRED EMBODIMENT

In general, throughout this description, if an item is described as implemented in software, it can equally well be implemented as hardware.

As used herein, "data" is either singular or plural, as the context requires.

As further used herein, "class," "class property," "class event," and "class method" are given their ordinary meanings as will be familiar to those of ordinary skill in the object oriented software programming arts. "Class method" is used herein to distinguish between a "method," as that term is common to patent claims, and invocable software executing in a computer and associated with a class. A "class process" is equivalent, as used herein, to a "class."

Figure 1:
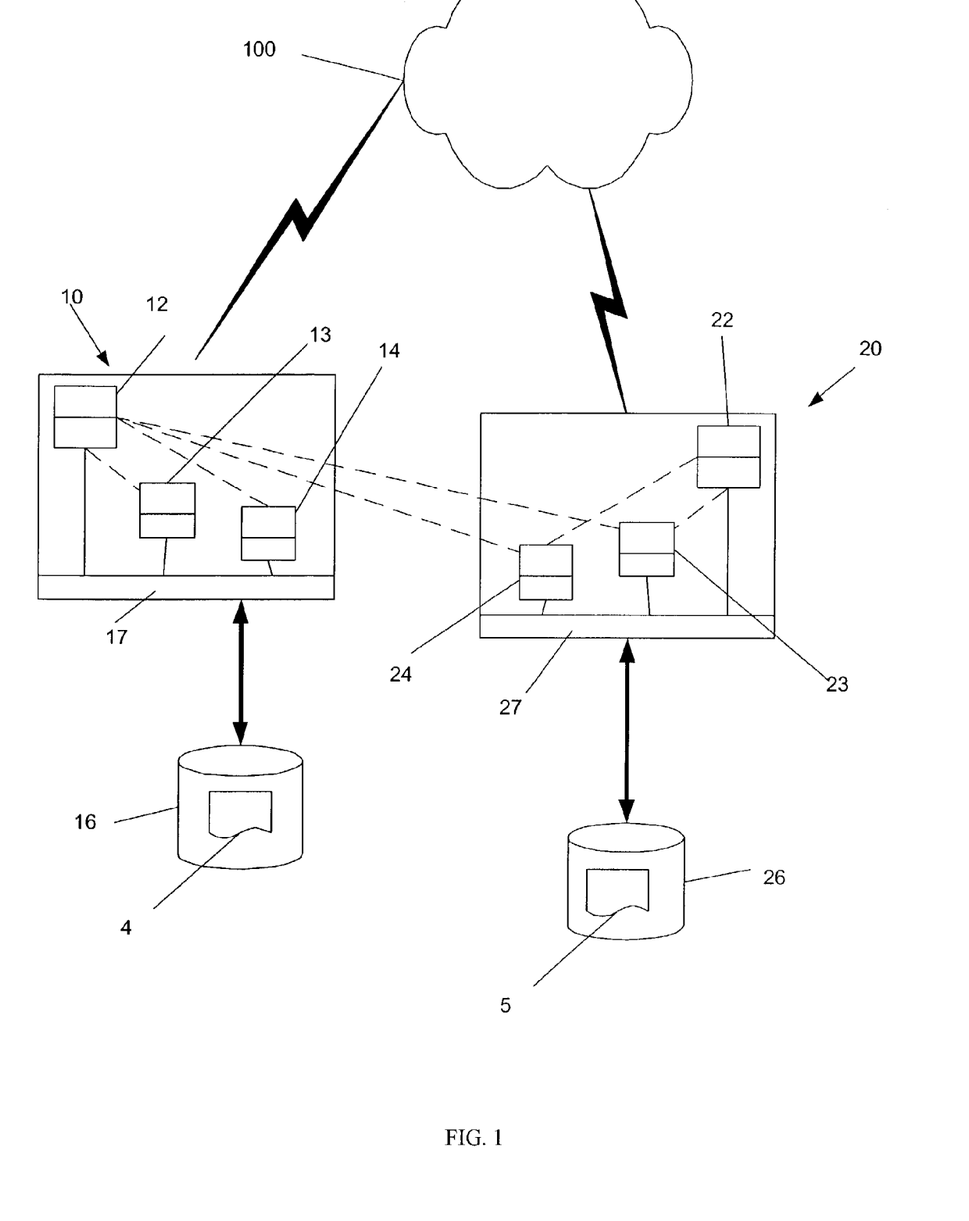
FIG. 1 is a schematic overview of an exemplary system.

Referring now to FIG. 1, in an exemplary embodiment, as will be familiar to those of ordinary skill in the computer arts, files may be distributed, e.g. file 4 and file 5. First processor 10 may have access to one or more files, e.g. file 4, resident on file storage 16. Similarly, second processor 20 may have access to one or more files, e.g. file 5 resident on file storage 26.

Client 12, client 22, file system class 13, file system class 23, file handler class 14, and file handler class 24 are all compliant with the Joint Tactical Radio System (JTRS) Software Component Architecture (SCA). Client 12, client 22, file system class 13, file system class 23, file handler class 14, and file handler class 24, in this example, may be either a class or a class method, as the context requires.

A client method or client process executing in a processor, e.g. client 12 executing in first processor 10, may desire access to a file, e.g. file 4 or file 5. In an exemplary embodiment, client 12 may invoke a file server service of a JTRS SCA server of which client 12 is aware, e.g. file system class 13. Client 12 may pass a reference or other identifier which identifies the file that client 12 is requesting, e.g. file 4, to a JTRS SCA class method such as a class method of file system class 13.

In a first exemplary scenario, client 12 may request access to file 5. As file 5 is remote to client 12, i.e. resident on data store 26 local to processor 20, file 5 will need to be accessed through JTRS SCA file system class 23 and/or file handler class 24, such as via operating CORBA methods accessed via the Internet 100. Access to files using CORBA is indicated by dashed lines in FIG. 1.

In a second exemplary scenario, client 12 may request access to file 4. In this second scenario, file 4 is resident on data store 16 which is local to processor 10. Accessing file 4 through JTRS SCA file system class 13 and/or file handler class 14 may add complexities and overhead not needed by client 12 as client 12 is executing in the same processor as file system class 13 and/or file handler class 14, i.e. first processor 10. In this second exemplary scenario, access to file 4 by client 12 may be faster and more efficient if client 12 is allowed to access file 4 more directly, such as by using file access system calls native to operating system 17 executing on first processor 10. Access to files using native operating system calls is indicated by solid lines in FIG. 1.

Figure 2:
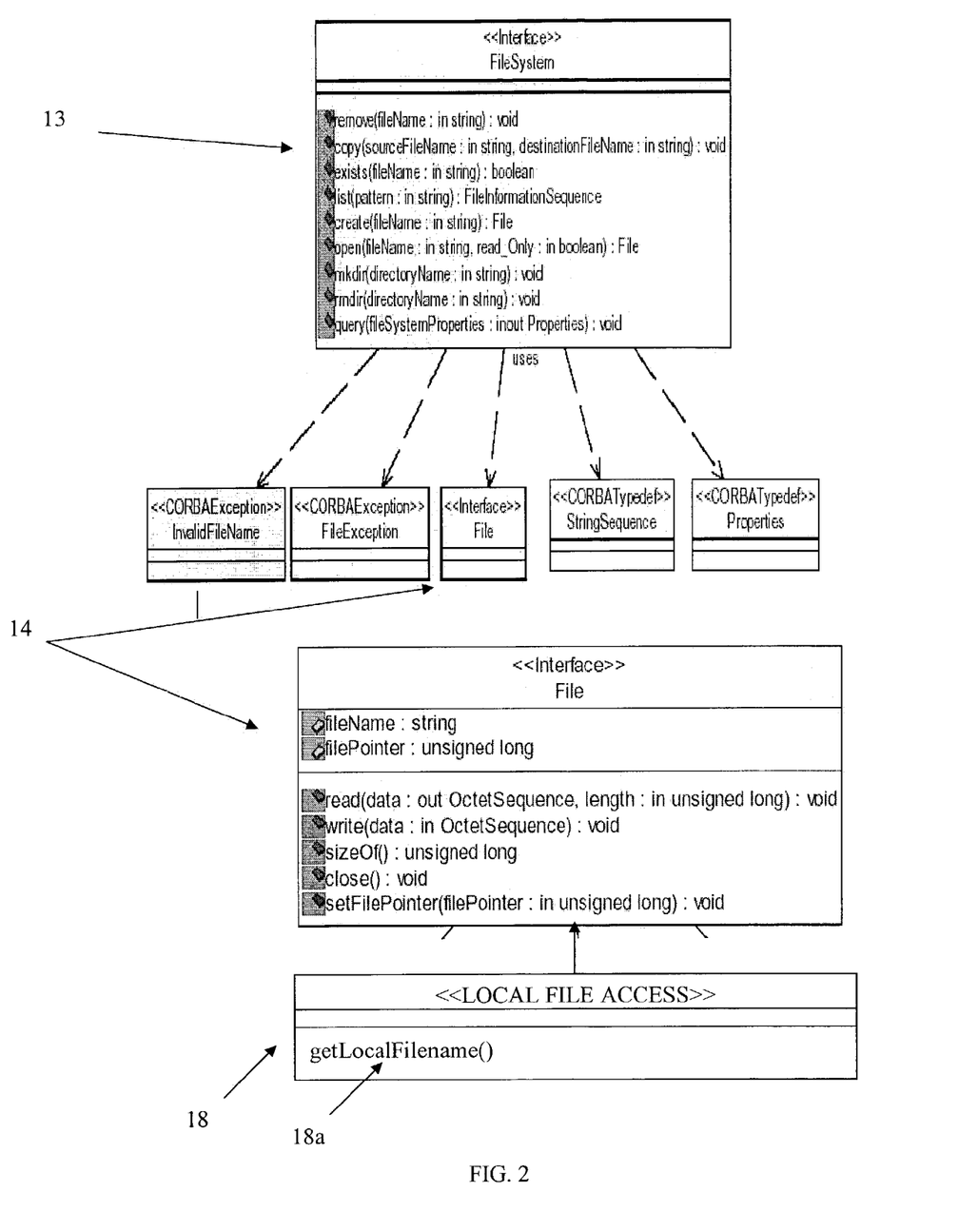
FIG. 2 is a schematic overview of file system, file handler, and local file access

Referring now to FIG. 2, file system class 13 is an instance of a base JTRS SCA file access class. In an embodiment, when invoked, file system class 13 may create an instance of a JTRS SCA compliant file handler class, e.g. file handler class 14. As will be familiar to those of ordinary skill in object oriented software programming arts, file system class 13 and file handler class 14 may each comprise properties, events, and methods (PEM), some of which may be exposed and some of which may be private. As file system class 13 and file handler class 14 are instances of a base JTRS SCA class, file system class 13 and file handler class 14 may each further present a JTRS SCA standard application programming interface (API) that is compliant with a JTRS SCA file access API for their class.

Additionally, local file class 18 may be added to file handler class 14 as an extension to file handler class 14. Local file class 18 may be added to file handler class 14 as a class method of a base file handler class 14 or may be a class instance based on file handler class 14 which has its own class methods and/or properties. As a class instance based on file handler class 14, local file class 18 will inherit file handler class 14 properties, events, and methods, allowing local file class 18 to use those inherited properties, events, and methods as defaults. Local class 18 may further comprise determination class method 18a operable to determine if a process such as client 12 which is invoking local class 18, directly or indirectly, is on a same processor, e.g. 10, as a file to which access has been requested, e.g. file 4.

Figure 3:
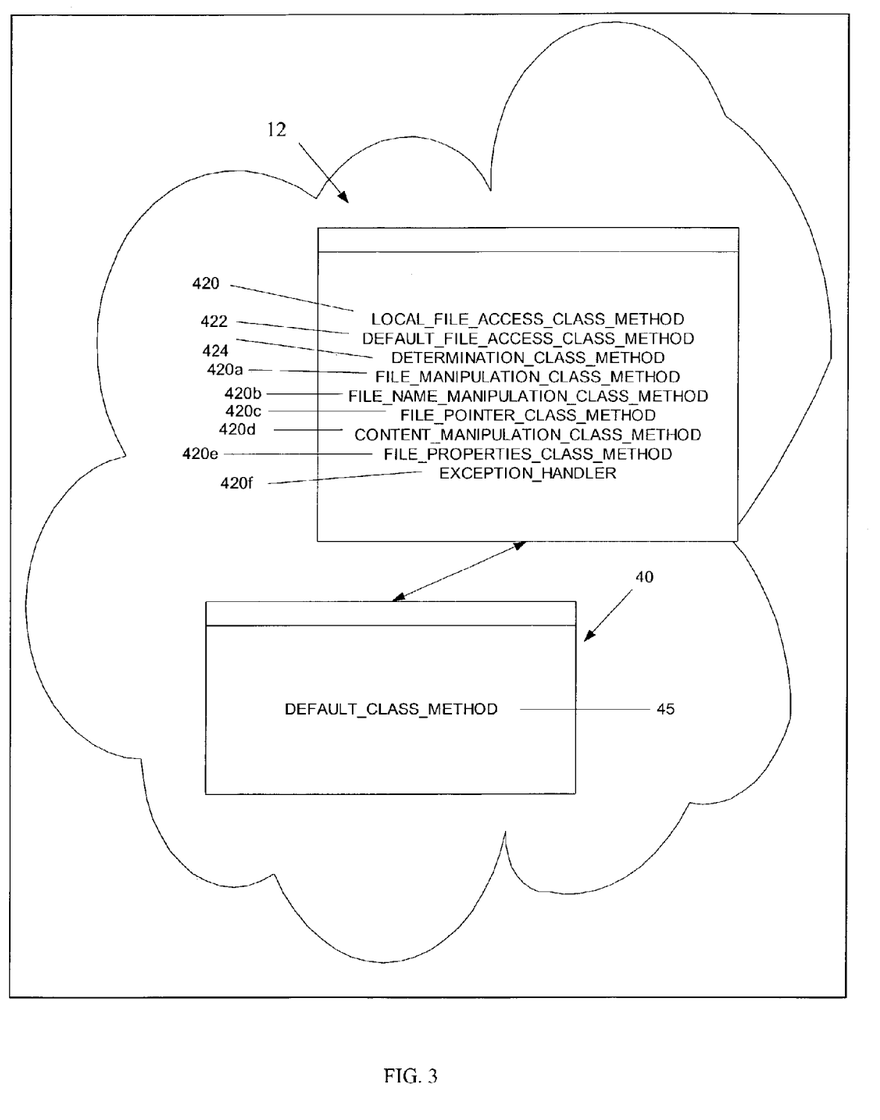
FIG. 3 is a schematic overview of client file access classes.

Referring now to FIG. 3, client 12 may further comprise one or more class methods. In an exemplary embodiment, client 12 comprises local file access class method 420, which may be usable, e.g. able to be invoked, to access a file local to processor 10 (FIG. 1) in which client 12 is resident, such as file 4 (FIG. 1) and a default class method 422 usable to access a file not local to processor 10, e.g. file 5, where default class method 422 may default to class method 45 of file access class 40. Access to non-local files such as file 5 may be accomplished through a file server class on the remote processor where the non-local file resides, e.g. file system class 23 on processor 20.

As used herein, local file access class method 420 may comprise one or more individual class methods to provide functionality to access file 4 (FIG. 1). In an embodiment, functionality for local file access class method 420 resides in individual class methods such as file manipulation method 420a, file name manipulation method 420b, file pointer method 420c, content manipulation method 420d, file properties method 420e, exception handler 420f, or the like, or a combination thereof.

File manipulation class method 420a may comprise one or more class methods to accomplish reading, writing, opening, closing, creating, or deleting functions, or the like, or a combination thereof.

File name manipulation method 420b may comprise one or more class methods to accomplish file name retrieval, file name modification, or the like, or a combination thereof. File name retrieval may be invoked to return a file name associated with file 4 (FIG. 1) where the file name is obtained from an interface to operating system 17 executing in processor 10.

File pointer method 420c may comprise one or more class methods to accomplish file pointer retrieval or file pointer modification. In the JTRS SCA, a file interface comprises class 40 (FIG. 3) that provides the ability to read and write files residing within a JTRS CF-compliant, distributed file system wherein a file can be thought of conceptually as a sequence of octets with a current filePointer describing where the next read or write will occur. This filePointer points to the beginning of the file upon construction of the file object.

Content manipulation method 420d may comprise one or more class methods to accomplish accessing content of file 4 (FIG. 1), e.g. reading content, writing content, or the like, or a combination thereof.

File properties method 420e may be used to obtain a property of file 4 (FIG. 1), e.g. a read-only status of file 4, a physical size of file 4, a filename of file 4, time of file creation, date of file creation, time of the last access to the file, date of the last access to the file, time of the last modification of the file, date of the last modification of the file, or the like, or a combination thereof.

Figure 4:
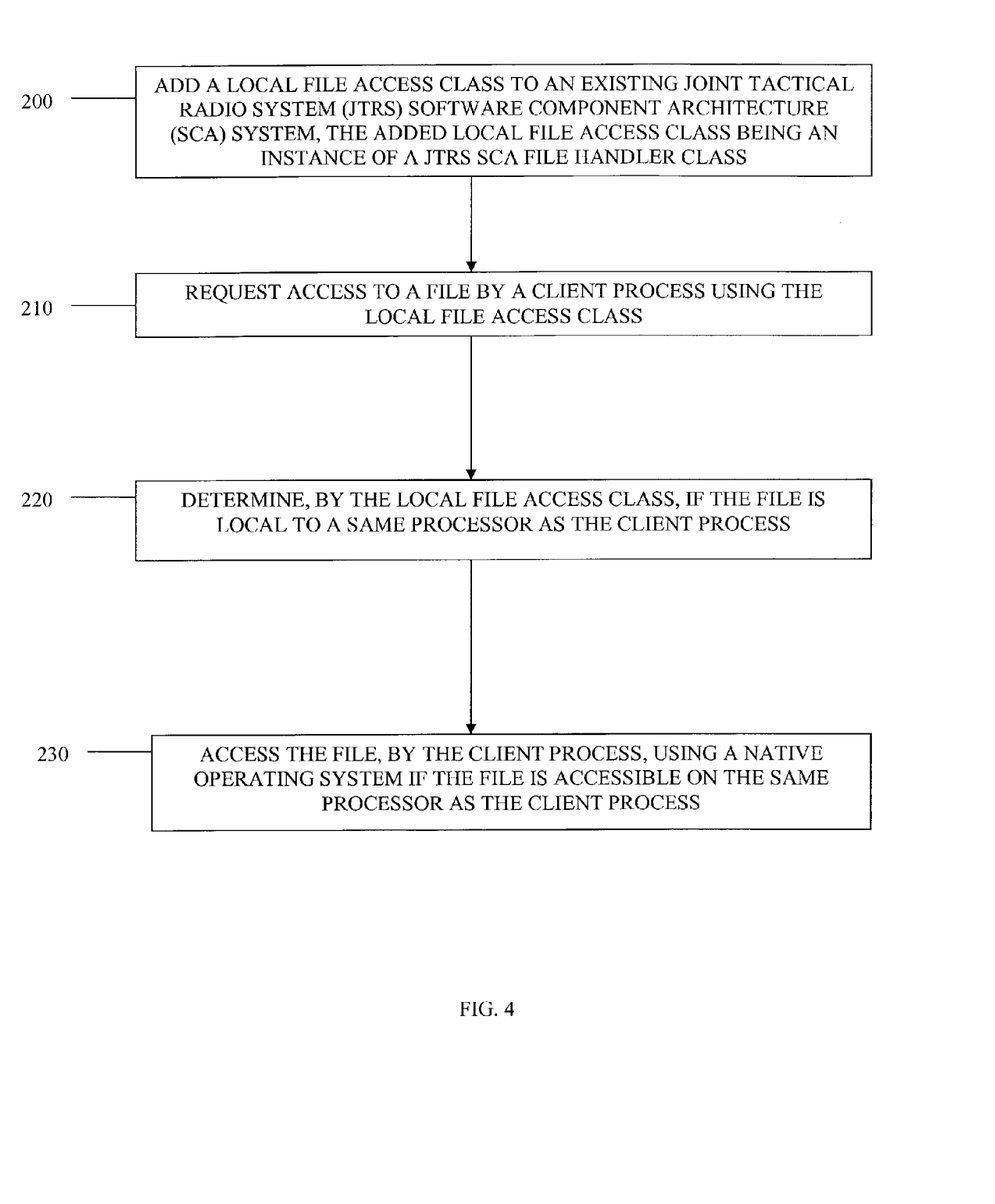
FIG. 4 is a flowchart of a first exemplary method.
Figure 5:
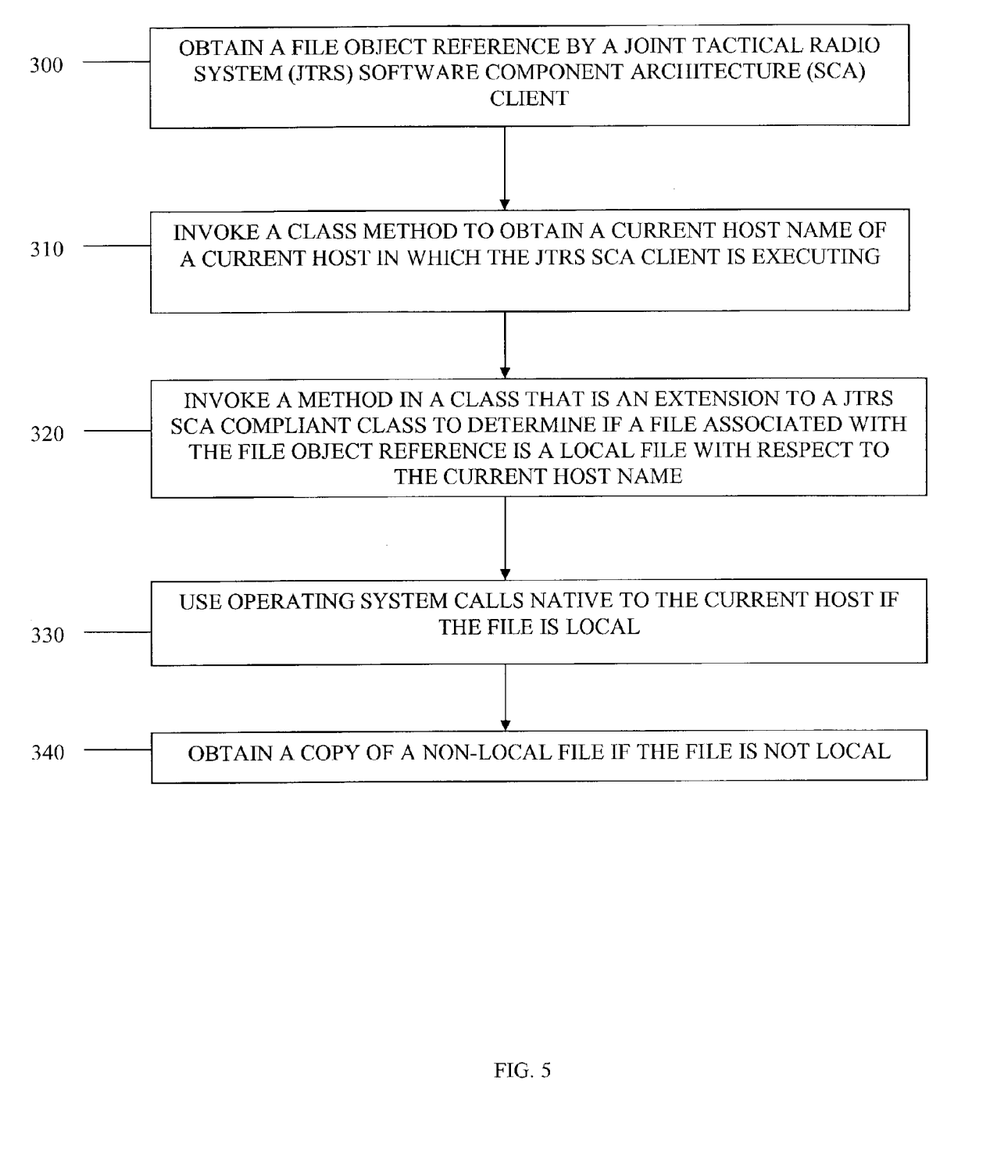
FIG. 5 is a flowchart of a second exemplary method.

In the operation of an exemplary embodiment, referring now to FIG. 4 and FIG. 5, in a typical JTRS SCA system, file system class 13 (FIG. 1) is created and initialized and handles at least a portion of access to local files, e.g. file 4 (FIG. 1). File system class 13 may further export an object reference back to a client process, e.g. 12 (FIG. 1), for use in accessing files. Typically, file system class 13 will cause an instance of file handler class 14 (FIG. 1) to be created to handle at least a portion of access to a local file, e.g. 4.

An existing JTRS SCA system may be expanded by use of local file class 18 (FIG. 2). In an exemplary embodiment, file 4 (FIG. 1) may be accessed using a file access interface provided by file system class 13 and/or file handler class 14. An invocable file access class such as local file class 18 may be added to an existing Joint Tactical Radio System (JTRS) Software Component Architecture (SCA) file handler class 14 (FIG. 2) such as by creating local file class 18 as a class based on file handler class 14 (step 200).

A client process such as client 12 (FIG. 1) may request access to file 4 using the JTRS SCA file access API. (step 210) Accessing file 4 may comprise requesting a determination of a file name of file 4, a determination of a file attribute of file 4, manipulating content of file 4, or the like. The file name may be a fully qualified, native operating system file name, e.g. one comprising a path to the file, the file name, and the file extension. As will be familiar to one of ordinary skill in the software arts, one or more methods in file system class 13 and/or file handler class 14 may be used to accomplish these functions.

Once it receives a request or message from client 12,22, local file class 18 may determine if file 4 is local to the same processor, e.g. 10 (FIG. 1), as client 12,22. (Step 220) For example, clients 12,22 (FIG. 1) may issue a request by invoking an appropriate method in local file class 18 (FIG. 2) such as by passing a first identifier local to client 12,22, e.g. a CPU ID, to local file class 18. A class method in local file class 18 may then identify a second identifier where the second identifier is local to local file class 18, e.g. a CPU ID. A class method in local file class 18 may then compare the first identifier to the second identifier. File 4 may be found to be local when the first identifier equals the second identifier.

If file 4 (FIG. 1) is local to the same processor, e.g. as may occur if client 12 (FIG. 1) desires access to file 4 (FIG. 1), the requesting client 12, upon determining that file 4 is local to the same processor, 10, may then use operating system calls native to operating system 17 (FIG. 1) to effect further access to file 4, bypassing file system class 13 and file handler class 14. (step 230)

If file 4 is not local, such as if client 12 is the requesting client needing further access to file 5, file access to file 5 may be accomplished by using JTRS SCA default class methods such as over the Internet 100 (FIG. 1), e.g. using file system class 23 and CORBA.

In certain embodiments, client 12,22 may access a file object reference (step 300 in FIG. 5) and invoke a class method to obtain a current host name of a current host in which client 12,22 is executing (step 310 in FIG. 5). A class method such as in file handler 14,24 may be invoked to determine if a file, e.g. 4 or 5, which is associated with the file object reference is a local file with respect to the current host name (step 320 in FIG. 5). In a currently envisioned embodiment, file handler 14,24 is closed after the determination is made.

If the requested file is local, client 12,22 may use operating system calls native to the current host for accessing the file (step 330 in FIG. 5). Otherwise, client 12,22 may obtain a copy of a non-local file, e.g. file 5 requested by client 12, such as by writing a copy of file 5 to data store 16 local to the current host 10 and then closing the copied, non-local file 5 (step 340 in FIG. 5). The copy may be obtained using file system class 23,24. This may be advantageous when the file desired is an executable file, e.g. a dynamically linked library file. Once copied, client 12 may use operating system calls native to the current host for accessing the copy of file 5. In a preferred embodiment, once access to file 5 is no longer required, client 12 may delete the copied, local file.

It will be understood that various changes in the details, materials, and arrangements of the parts which have been described and illustrated above in order to explain the nature of this invention may be made by those skilled in the art without departing from the principle and scope of the invention as recited in the appended claims.

We claim:

1. A computer-implemented method of accessing a file using a predefined file interface, comprising the steps of:
    a. adding a local file access class to an existing Joint Tactical Radio System (JTRS) Software Architecture (SCA) system, the added local file access class being an instance of a JTRS SCA file handler class;
    b. requesting access to a file by a client process using the local file access class;
    c. determining by the local file access class if the file is local to a same processor as the client process; and
    d. accessing the file, by the client process, using a native operating system if the file is accessible on the same processor as the client process;
    whereby a file is accessed using a predefined file interface, said predefined file interface being either a native operating system or a JTRS SCA file interface.

2. The method of claim 1, further comprising the step of:
    e. using the native operating system by the client process to access the file in further requests to access the file by the client process.

3. The method of claim 1, further comprising the step of:
    e. using a JTRS SCA default class method if the file is not local to the same processor as the client process.

4. The method of claim 1, wherein the step of accessing the file comprises at least one of (i) determining a file name of the file, (ii) determining a file attribute of the file, or (iii) manipulating content of the file.

5. A method according to claim 4, wherein the file name is a fully qualified native operating system file name.

6. A method according to claim 1, wherein step (c) further comprises the steps of:
    (i) passing of a first identifier local to the client process by the client process to the local file access class;
    (ii) identifying a second identifier by the local file access class, the second identifier being local to the local file access class; and
    (iii) comparing the first identifier to the second identifier;
    (iv) wherein the file is local to a same processor as the client process when the first identifier equals the second identifier.

7. A method according to claim 6, wherein: the first identifier is an identifier unique to a central processing unit on which the client process is executing; and the second identifier is an identifier unique to a central processing unit on which the local file access class is executing.

8. A computer-implemented method of accessing a file from a Joint Tactical Radio System (JTRS) Software Component Architecture (SCA) client, comprising the steps of:
    a. obtaining a file object reference by a Joint Tactical Radio System (JTRS) Software Component Architect (SCA) client;
    b. invoking a class method to obtain a current host name of a current host in which the JTRS SCA client is executing;
    c. invoking a method in a class that is an extension to a JTRS SCA compliant class to determine if a file associated with the file object reference is a local file with respect to the current host name;
    d. using operating system calls native to the current host if the file is local; and
    e. obtaining a copy of a non-local file if the file is not local;
    whereby a file is accessed from a JTRS SCA client.

9. A method according to claim 8, wherein step (c) further comprises the step of closing the file after determining that the file is local.

10. A method according to claim 8, wherein step (e) further comprises the steps of:
    (i) writing the copy to a file system local to the current host;
    (ii) closing the non-local file; and
    (iii) using operating system calls native to an operating system executing at the current host for further file access to the copied, local file.

11. A method according to claim 10, further comprising the step of deleting the copied, local file when access to the copied, local file is no longer desired.

12. A file access interface in a computer readable medium, comprising:
    a local file access class base on a Joint Tactical Radio System (JTRS) Software Component Architecture (SCA) file handler class, further comprising:

a determination class method operable to determine if a process which is invoking the local file access class is on a same processor as a file to which access has been requested;

wherein the file access interface includes the local file access class and the determination class method.

13. The file access interface of claim 12, wherein the local file access class comprises a JTRS SCA standard application programming interface.

14. The file access interface of claim 12, wherein the local file access class further compromises at least one of (i) a file manipulation method, (ii) a file pointer method, (iii) a content manipulation method, (iv) a file properties method, (v) a file name retrieval method, or (vi) an exception handler.

15. The file access interface of claim 14, wherein the file pointer method comprises at least one of (i) a file pointer retrieval method or (ii) a file pointer modification method.

16. The file access interface of claim 14, wherein the content manipulation method comprises at least one of (i) a read content method or (ii) a write content method.

17. The file access interface of claim 14, wherein the file properties method is useful to obtain a property of the file, the property comprising at least one of (i) a read-only status, (ii) a size of the file, (iii) a filename of the file, (iv) a time of creation of the file, (v) a time of last modification of the file, (vi) a time of last access of the file, (iv) a date of creation of the file, (v) a date of last modification of the file, or (vi) a date of last access of the file.

18. The file access interface of claim 14, wherein the file manipulation method comprises a file close method.

* * * * *